M. B. Vidal,
Scroll Sawing Machine.
N° 19,168.   Patented Jan. 19, 1858.
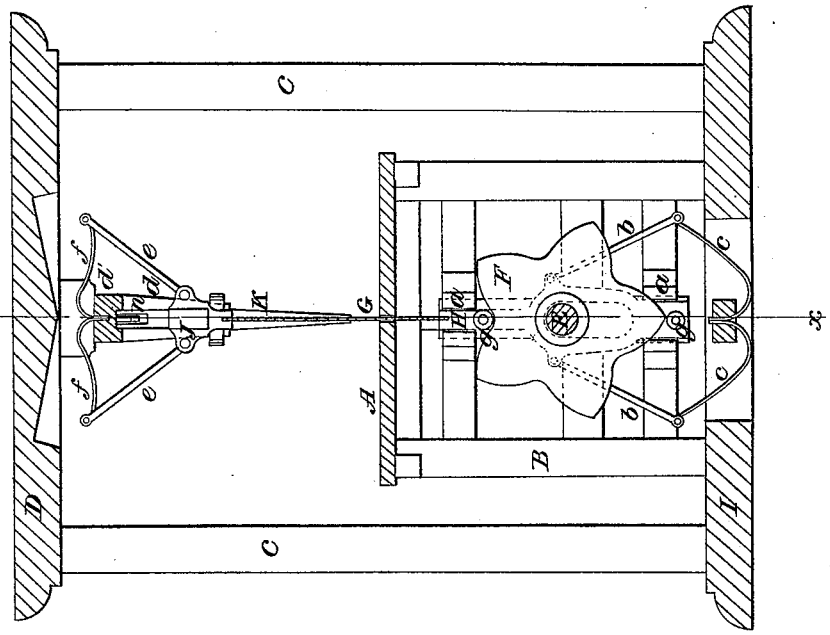
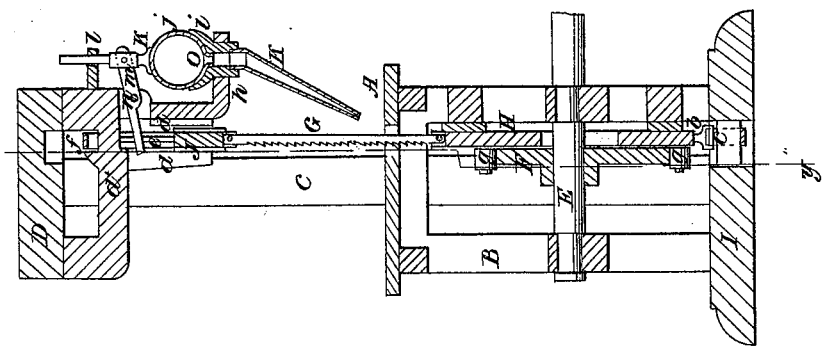

UNITED STATES PATENT OFFICE.

ULYSSES B. VIDAL, OF PHILADELPHIA, PENNSYLVANIA.

SCROLL-SAWING MACHINE.

Specification of Letters Patent No. 19,168, dated January 19, 1858.

*To all whom it may concern:*

Be it known that I, ULYSSES B. VIDAL, of Philadelphia, in the county of Philadelphia and State of Pennsylvania, have invented a new and useful Improvement in Scroll or Muley Saw Machines; and I do hereby declare that the following is a full, clear, and exact description of the same, reference being had to the annexed drawings, making a part of this specification, in which—

Figure 1, is a vertical central section of my improvement taken in the line $(x,)$ $(x,)$ Fig. 2. Fig. 2, is also a vertical central section of ditto taken in the line $(y)$ $(y)$ Fig. 1, the two planes of section crossing each other at right angles.

Similar letters of reference indicate corresponding parts in the two figures.

This invention consists in attaching the upper and lower ends of the saw to springs and giving the saw a reciprocating motion by means of a cam, the parts being arranged as hereinafter described, whereby the saw is properly strained without a sash and the saw operated smoothly, all "back lash" being prevented.

The invention also consists in the employment of a novel means for clearing the platform and work of sawdust so that the tracing on the work may not be obscured thereby.

To enable those skilled in the art to fully understand and construct my invention I will proceed to describe it.

A represents a platform which is placed on a suitable rectangular framing B, and C, C, are two uprights which extend some distance above the platform A and are connected by a cross tie D.

In the framing B a shaft E is placed and on this shaft a cam F is keyed. The cam is star-shaped or it may be described as being of scalloped form having five points although more or less may be used.

G represents the saw, which passes through a slot in the platform A. The lower end of the saw is attached to a slide H, which is fitted in guides $(a)$ $(a)$ in the framing B. The slide H is slotted vertically, the shaft E passing through it, and rods $(b)$ $(b)$ are pivoted to the upper end of the slide, one at each side, the lower ends of the rods being attached to springs $(c)$ $(c)$ which are attached to the base I of the framing B. The upper end of the saw is attached to a slide J which is fitted between guides $(d)$ $(d)$ attached to a crosspiece $(d')$ on the under side of the cross tie D. To each side of the slide J, a rod $(e)$ is pivoted and the upper ends of these rods are attached to springs $(f)$ $(f)$ the inner ends of which are attached to the cross piece $(d')$.

The springs $(c)$, $(c)$, $(f)$, $(f)$, are formed of flat steel strips properly tempered and they are designed to be sufficiently strong to properly strain the saw.

To the slide H there are attached two friction rollers $(g)$ $(g)$ and the cam F works between these rollers. The rollers are placed at such a distance apart that when one is at the apex of one of the points of the cam, the other will be between two points at its opposite side, see Fig. 2, in which the lower roller $(g)$ is at the tip end of the lower point of the cam and the other in the angle formed by the two uppermost points.

To the back side of the rear guide $(d)$ there is attached a horizontal projection $(h)$ said projection having a socket $(i)$ on its outer end in which an elastic hollow sphere $(j)$ is placed. This sphere may be constructed of india rubber or other suitable material and a plunger $(k)$ bears upon its upper surface. The upper end of this plunger is fitted and works in a guide $(l)$ and the outer end of a lever $(m)$ is pivoted to it, said lever having its fulcrum at $(n)$, its inner end passing through the guide $(d)$ and projecting over the slide J.

K is a tube the upper end of which is connected with the socket $(j)$, said tube being inclined so that its orifice will point toward the slot in the platform through which the saw passes. The lower part of the elastic sphere $(j)$ has an opening $(o)$ at its lower end, see Fig. 1.

The operation is as follows: By turning the shaft E the cam F, will give the saw G a reciprocating motion, the points of the cam first acting against one collar and then acting against the other, and the springs $(f)$, $(f)$, $(c)$, $(c)$, will keep the saw properly strained, preventing all reaction at the ends of the strokes. At the same time, or, while the saw is in operation, the upper slide J, will actuate the inner end of the lever $(m)$ and the elastic sphere $(j)$ will be compressed at each upward movement of the saw, by the action of the plunger $(k)$ upon it, the sphere expanding by its own elasticity when relieved from the presence of the plunger during the downward movement of the saw. By this action of the sphere a blast of air is forced through the tube K said blast blowing the sawdust from the work and thereby preventing the tracing lines from being obscured thereby.

The pattern is marked out on the stuff and the stuff guided by hand to the saw in the usual manner, and the blast generated as described saves the operator the trouble of blowing away with his breath the sawdust from the work, the sawdust at present covering the tracing and requiring to be blown away frequently in order that the pattern or tracing may be seen.

I am aware that a cam similar to the one F herein described has been previously used for operating reciprocating saws, but I am not aware that said cam has ever been used in connection with springs applied to the saw so as to strain the saw and at the same time prevent reaction or "back lash" which would otherwise attend the operation of the same by means of the cam.

What I claim therefore as new and desire to secure by Letters Patent, is,

The arrangement of the slotted slide H with a cam F, embraced by the friction rollers ($g$) and operated in connection with the springs ($f, f, c, c$) all as herein set forth.

ULYSSES B. VIDAL.

Witnesses:
   ANDW. J. BATEMAN,
   JOS. T. HALLOWELL.